(No Model.)
W. MITCHELL.
HAT BRIM SOFTENING DEVICE.
No. 491,319. Patented Feb. 7, 1893.
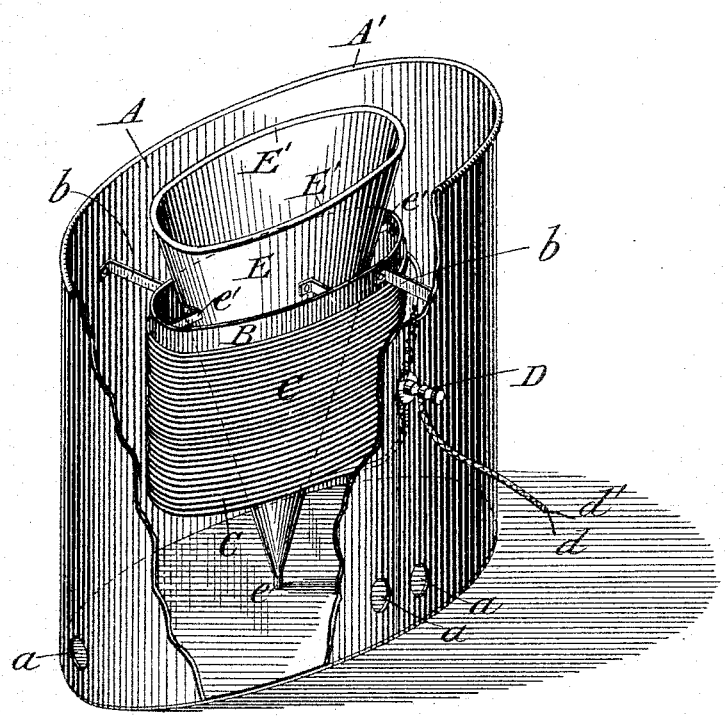
Attest:
H. H. Schott
E. J. Hussen
Inventor
Willis Mitchell
by
W. H. Babcock
Attorney
THE NORRIS PETERS CO., PHOTO-LITHO., WASHINGTON, D. C.

UNITED STATES PATENT OFFICE.

WILLIS MITCHELL, OF MALDEN, ASSIGNOR, BY MESNE ASSIGNMENTS, TO THE AMERICAN ELECTRIC HEATING COMPANY, OF BOSTON, MASSACHUSETTS.

HAT-BRIM-SOFTENING DEVICE.

SPECIFICATION forming part of Letters Patent No. 491,319, dated February 7, 1893.

Application filed June 8, 1892. Serial No. 435,931. (No model.)

*To all whom it may concern:*

Be it known that I, WILLIS MITCHELL, a citizen of the United States, residing at Malden, in the county of Middlesex and State of Massachusetts, have invented certain new and useful Improvements in Electrically-Heated Hat-Brim-Softening Devices; and I do hereby declare the following to be a full, clear, and exact description of the invention, such as will enable others skilled in the art to which it appertains to make and use the same.

The object of this invention is to provide convenient and satisfactory means for softening hat brims in order to fit or mold them to purchasers' heads; electricity being employed to generate the heat and thereby the vapor necessary to this operation.

To this end my invention consists in the combination with an exterior casing or receptacle, adapted to support a hat and provided with openings allowing the passage of a current of air to the hat-brim, of an electric heater arranged within the said casing or receptacle and means for making electrical communication through the latter with the wire or other resisting conductor of the said heater, the current of air carrying up vaporized moisture to the hat-brim for the purpose stated.

The said invention also consists in combining with the said casing and heater a deflector arranged to direct the current of air to the points where it is to be applied.

The said invention further consists more specifically in the combination of a deflector in the form of an inverted cone, with a cylindrical electric heater surrounding the same and an exterior casing or receptacle which is open at the top, its rim and the rim of the deflector leaving between them an annular space corresponding to the hat-brim which rests thereon; and in certain additional details of construction arrangement and combination hereinafter more particularly set forth and claimed.

The accompanying drawing represents a perspective view of an electric hat-brim-softening device embodying my invention, the casing or receptacle being partly broken away to show the heater and deflector within.

A designates the exterior casing or receptacle which is preferably of cylindrical form, closed at the bottom but open at the top, with air-inlet holes $a$ in the lower part of its side-wall, these nevertheless allowing space for liquid below them. From this side-wall arms or brackets $b$ extend inwardly in any convenient number to a hollow metallic cylinder B which constitutes the core of the electric heater; the remainder of said heater being composed of an insulated wire helix C which is wound thereon in one or more layers as desired. The ends of the said helix are connected to a binding post D or equivalent device extending through the side wall of the casing or receptacle A to which the suitably incased circuit wires $d$ $d'$ are also connected. This brings the wire helix C, or other conductor or resistance which may be substituted therefor into circuit; with the usual result of evolving heat. The said heater is held securely by the said arms or brackets about in the middle of the said casing or receptacle.

E designates a deflector having the shape of an inverted cone, and fastened at its apex by a stud $e$ to the center of the base of receptacle A. It extends up within the said heater to a level with the top of the receptacle its longitudinal axis coinciding with that of the cylindrical core B and the cylindrical casing or receptacle A. Arms or brackets $e'$ extend from the said core inward to the said deflector being fastened to both and bracing both, but especially the latter. If preferred, the core B may be covered with asbestus or other insulating material.

The rim A' of the casing or receptacle A and the rim E' of the deflector E leave an annular space between them corresponding approximately to a hat-brim.

The operation is as follows. Water or any other suitable liquid being supplied to the said receptacle in small quantities, the electric heater is put into circuit and the air within the casing A is heated, causing a continual draft or current from openings $a$ up through the interior of the said casing or receptacle to the hat brim which rests on the rims A' E'; and also vaporizing the liquid at the bottom of the said receptacle and carrying it up to the said brim; where the deflector E insures the full application of the current of heated air and its entire charge of moisture to the said brim. These agencies act on the latter to soften it so that it will no longer resist molding to fit the head of the purchaser and wearer. The said deflector, being of smooth metal, acts also as a heat reflector, and thereby doubles or greatly increases the action of the electric heater on the air or the liquid within the receptacle or casing.

The same devices may be applied to other articles than hat-brims for the purpose of heating and moistening them; it being necessary only to rest such articles on the top of the said receptacle, or hold them over the same in the ascending current.

Having thus described my invention, what I claim as new and desire to secure by Letters Patent is:

1. In combination with an exterior casing, an inner casing or deflector arranged to leave an annular space between them and an electrical heater which is arranged in this space and surrounds the said deflector substantially as set forth.

2. In combination with an exterior casing having openings through it near the bottom an inner casing or deflector arranged to leave an annular space between them which is open at the top and an electrical heater arranged in the said annular space, the top edges of the said casings being arranged to support a hat-brim in position to be acted on by the ascending steam and hot air substantially as set forth.

3. In combination with an external casing or receptacle, a deflector in the shape of an inverted cone arranged within the said receptacle so as to leave an annular space between the rims of these parts, and an electric heater surrounding the said deflector substantially as set forth.

4. In combination with a receptacle or casing, a deflector in the shape of an inverted cone attached to and supported on the bottom of the said receptacle, a metallic cylinder constituting the core of an electric heater and surrounding at an interval the said deflector, an electric conductor wound on the said cylinder and forming part of an electric circuit, and rigid arms or brackets connecting the said receptacle to the said cylinder and the said cylinder to the said deflector substantially as set forth.

In testimony whereof I affix my signature in presence of two witnesses.

WILLIS MITCHELL.

Witnesses:
   EDWIN W. PIERCE,
   PELATIAH R. TRIPP.